United States Patent Office 3,197,494
Patented July 27, 1965

3,197,494
S-(10-PHENOXARSINYL) XANTHATES
Stanley J. Strycker, Midland, Mich., assignor to The Dow Chemical Company, Midland, Mich., a corporation of Delaware
No Drawing. Filed Oct. 29, 1962, Ser. No. 233,904
5 Claims. (Cl. 260—440)

This invention is directed to S-(10-phenoxarsinyl) esters of the lower alkoxyethyl xanthic acids corresponding to the formula:

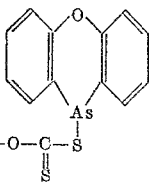

lower alkoxy-CH$_2$—CH$_2$—O—C—S
                                   ‖
                                   S In the present specification and claims, the expression "lower alkoxy" is employed to refer to alkoxy radicals containing from 1 to 5 carbon atoms, inclusive. These compounds are crystalline solid materials which are somewhat soluble in a number of common organic solvents and of very low solubility in water. The compounds are useful as parasiticides for the control of a number of parasite species such as worms, flies, tapeworms, beetles and aphids. The compounds are also useful for the modification and inhibition of the growth of plants and plant parts. Thus, they are adapted to be applied to plants, plant parts and their habitats for the modification and inhibition of the growth of aquatic, terrestrial and bacterial and fungal plants. Representative habitats include cutting oils, inks, glues, paper, textiles, oil and latex paints and high energy fuels.

The new compound of the present invention can be prepared by reacting a 10-halophenoxarsine with an alkali metal salt of a lower alkoxyethyl xanthic acid. The reaction conveniently is carried out in a liquid material such as acetone, benzene, water or xylene. The exact amounts of the 10-halophenoxarsine and acid salt reagents to be employed are not critical, some of the desired product being obtained when employing any proportion of ingredients. In the preferred mode of operation, about one molecular proportion of 10-halophenoxarsine is employed with one molecular proportion of the salt reagent and conveniently the sodium, potassium or ammonium salt. The reaction takes place smoothly at temperatures from 0° to 140° C. with the production of the desired product and alkali metal chloride of reaction. In carrying out the reaction, the 10-halophenoxarsine, such as the 10-chlorophenoxarsine or 10-bromophenoxarsine, and alkali metal salt of the acid are mixed and contacted together in any convenient fashion and maintained for a period of time at a temperature of from 0° to 140° C. to complete the reaction. Following the completion of the reaction, the desired product can be separated and purified by conventional procedures such as filtration, decantation, washing with water and recrystallization from common organic solvents.

In a representative operation, potassium 2-methoxyethyl xanthate (22.8 grams; 0.12 mole) is added portionwise with stirring to 27.8 grams (0.10 mole) of 10-chlorophenoxarsine dispersed in 210 milliliters of benzene. The addition is carried out over a period of 15 minutes and at a temperature of 20° to 30° C. Stirring is thereafter continued and the mixture maintained at a temperature of 35° C. for one hour to complete the reaction. The reaction mixture is then filtered and the solvent removed from the filtrate by evaporation under reduced pressure to obtain the S-(10-phenoxarsinyl) 2-methoxyethyl xanthate product as a crystalline solid having a molecular weight of 394.32 and carbon and sulfur contents of 48.73 percent and 16.26 percent, respectively.

In a further operation, potassium 2-normal butoxyethyl xanthate (34.8 grams; 0.15 mole) is dissolved in 200 milliliters of water and the resulting solution added portionwise with stirring to 36.1 grams (0.13 mole) of 10-chlorophenoxarsine dispersed in 300 milliliters of acetone. The addition is carried out over a period of 30 minutes and at a temperature of 15° to 20° C. Stirring is thereafter continued at room temperature for 30 minutes to insure completion of the reaction. Following the reaction, the reaction mixture is diluted with ice. The S-(10-phenoxarsinyl) 2-normal butoxyethyl xanthate product crystallizes in the diluted and cooled mixture, and is separated by filtration and dried. The dried product is recrystallized from isopropanol and found to melt at 51° to 52° C.

In exactly comparable operations, 10-chlorophenoxarsine is reacted with sodium 2-ethoxyethyl xanthate, potassium 2-isopropoxyethyl xanthate and potassium 2-amyloxyethyl xanthate to produce the correponding S-(10-phenoxarsinyl) ester of 2-ethoxyethyl xanthic acid, 2-isopropoxyethyl xanthic acid and 2-amyloxyethyl xanthic acid as crystalline solid materials.

The xanthate materials employed as starting products in accordance with the present teachings can be prepared by reacting together (1) a lower alkoxyethanol, (2) an alkali metal hydroxide and (3) carbon disulfide. In carrying out the reaction, the lower alkoxyethanol and alkali metal hydroxide can be dispersed in an organic liquid as reaction medium and the carbon disulfide added thereto with stirring. Upon completion of the reaction, the desired alkali metal lower alkoxyethyl xanthate product can be separated from the reaction mixture by conventional methods.

The compounds of the present invention are useful as pesticides for the control of a number of insect and plant species. For such uses, the products can be dispersed on inert finely divided solids and employed as dusts. Such mixtures also can be dispersed in water with or without the aid of surface active dispersing agents and employed as sprays. In other procedures, the products can be employed as active constituents in inks, glues, oils, fuels, paper, wood, aqueous emulsions or dispersions and cooling tower and well flooding waters. In representative operations, aqueous compositions containing 500 parts per million by weight of S-(10-phenoxarsinyl) 2-ethoxyethyl xanthate give substantially complete controls of tomato late blight, coontail, green algae, nematodes and the soil-dwelling organisms of root rot and decay.

What is claimed is:
1. S-(10-phenoxarsinyl) 2-lower alkoxyethyl xanthate.
2. S-(10-phenoxarsinyl) 2-methoxyethyl xanthate.
3. S-(10-phenoxarsinyl) 2-ethoxyethyl xanthate.
4. S-(10-phenoxarsinyl) 2-isopropoxyethyl xanthate.
5. S-(10-phenoxarsinyl) 2-n-butoxyethyl xanthate.

References Cited by the Examiner
FOREIGN PATENTS
134,082   12/60   Russia.

OTHER REFERENCES
Zhurnal Obschei Khimi, vol. 31, pages 845 to 849, March 1961.

TOBIAS E. LEVOW, *Primary Examiner.*